United States Patent
Chappell et al.

(10) Patent No.: US 9,182,230 B2
(45) Date of Patent: Nov. 10, 2015

(54) SYSTEMS AND METHODS FOR CONTROLLING THE GAS CONVERSION IN A FIBER-OPTIC GYROSCOPE

(71) Applicant: Honeywell International Inc., Morristown, NJ (US)

(72) Inventors: Charles D. Chappell, Treasure Island, FL (US); Kara L. Warrensford, Tampa, FL (US)

(73) Assignee: Honeywell International Inc., Morristown, NJ (US)

( * ) Notice: Subject to any disclaimer, the term of this patent is extended or adjusted under 35 U.S.C. 154(b) by 11 days.

(21) Appl. No.: 14/155,944

(22) Filed: Jan. 15, 2014

(65) Prior Publication Data

US 2015/0198444 A1    Jul. 16, 2015

(51) Int. Cl.
G01C 19/72    (2006.01)

(52) U.S. Cl.
CPC ............ *G01C 19/722* (2013.01); *G01C 19/721* (2013.01)

(58) Field of Classification Search
CPC ........ G01C 19/00; G01C 19/72; G01C 19/64; G01C 19/721; G01C 19/722
USPC .................................................. 356/460, 465
See application file for complete search history.

(56) References Cited

U.S. PATENT DOCUMENTS

| | | | |
|---|---|---|---|
| 5,245,687 A * | 9/1993 | Usui .............................. | 385/134 |
| 5,481,358 A | 1/1996 | Dyott et al. | |
| 5,870,194 A | 2/1999 | Cordova et al. | |
| 6,194,789 B1 * | 2/2001 | Zhou ............................. | 257/790 |
| 6,441,366 B1 | 8/2002 | Webb | |
| 6,785,455 B2 | 8/2004 | Fujii et al. | |
| 6,979,493 B2 | 12/2005 | Uchida et al. | |
| 7,182,975 B2 * | 2/2007 | Gregory ........................ | 427/162 |
| 2004/0247274 A1 | 12/2004 | Gregory | |
| 2007/0206196 A1 | 9/2007 | Heffner et al. | |
| 2008/0063344 A1 * | 3/2008 | Suzuki et al. ................ | 385/114 |
| 2011/0051144 A1 * | 3/2011 | Wilfinger et al. ............ | 356/459 |

OTHER PUBLICATIONS

European Patent Office, "Extended European Search Report from EP Application No. 15150544.3 mailed Jun. 10, 2015", "from Foreign Counterpart of U.S. Appl. No. 14/155,944", Jun. 10, 2015, pp. 1-8, Published in: EP.

SCS, "Specialty Coating Systems", "http://www.physics.rutgers.edu/podzprov/parylene%20properties.pdf", Feb. 1, 2007, pp. 1-12, Published in: US.

* cited by examiner

*Primary Examiner* — Jonathan Hansen
(74) *Attorney, Agent, or Firm* — Fogg & Powers LLC

(57) ABSTRACT

A fiber optic sensing coil apparatus for a fiber optic gyroscope is provided. In at least one embodiment, the fiber optic sensing coil apparatus comprises a housing providing a hermetically sealed chamber and an optical fiber disposed within the hermetically sealed chamber of the housing, wherein the optical fiber is disposed in a coil. A gas including oxygen is disposed in the hermetically sealed chamber between the coil of the optical fiber and the housing. Moreover, an adhesive is amongst the optical fiber, wherein the adhesive holds the optical fiber together in the coil; and, a layer of oxygen blocking material is disposed on an outer surface of the coil of optical fiber, wherein the oxygen blocking material has an oxygen transmission rate less than 15 cc/m$^2$/day.

20 Claims, 3 Drawing Sheets

SYSTEMS AND METHODS FOR CONTROLLING THE GAS CONVERSION IN A FIBER-OPTIC GYROSCOPE

BACKGROUND

A fiber-optic gyroscope (FOG) measures a rate of rotation. In an example, the FOG does this by operating in the following manner: a beam of light in a FOG is split into two beams, the two beams travel around a sensing coil, exit the sensing coil and then measured in a detector. The detector measures the phase difference between the two counter propagating beams of light. The phase shift experienced by the two beams of light is proportional to the rate of rotation of the FOG due to the Sagnac effect. If any of the FOG's components deteriorate over time, the FOG can become less accurate in measuring the light's phase shift.

SUMMARY

A fiber optic sensing coil apparatus for a fiber optic gyroscope is provided. In at least one embodiment, the fiber optic sensing coil apparatus comprises a housing providing a hermetically sealed chamber and an optical fiber disposed within the hermetically sealed chamber of the housing, wherein the optical fiber is disposed in a coil. A gas including oxygen is disposed in the hermetically sealed chamber between the coil of the optical fiber and the housing. Moreover, an adhesive is amongst the optical fiber, wherein the adhesive holds the optical fiber together in the coil; and, a layer of oxygen blocking material is disposed on an outer surface of the coil of optical fiber, wherein the oxygen blocking material has an oxygen transmission rate less than 15 $cc/m^2/day$.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1A:
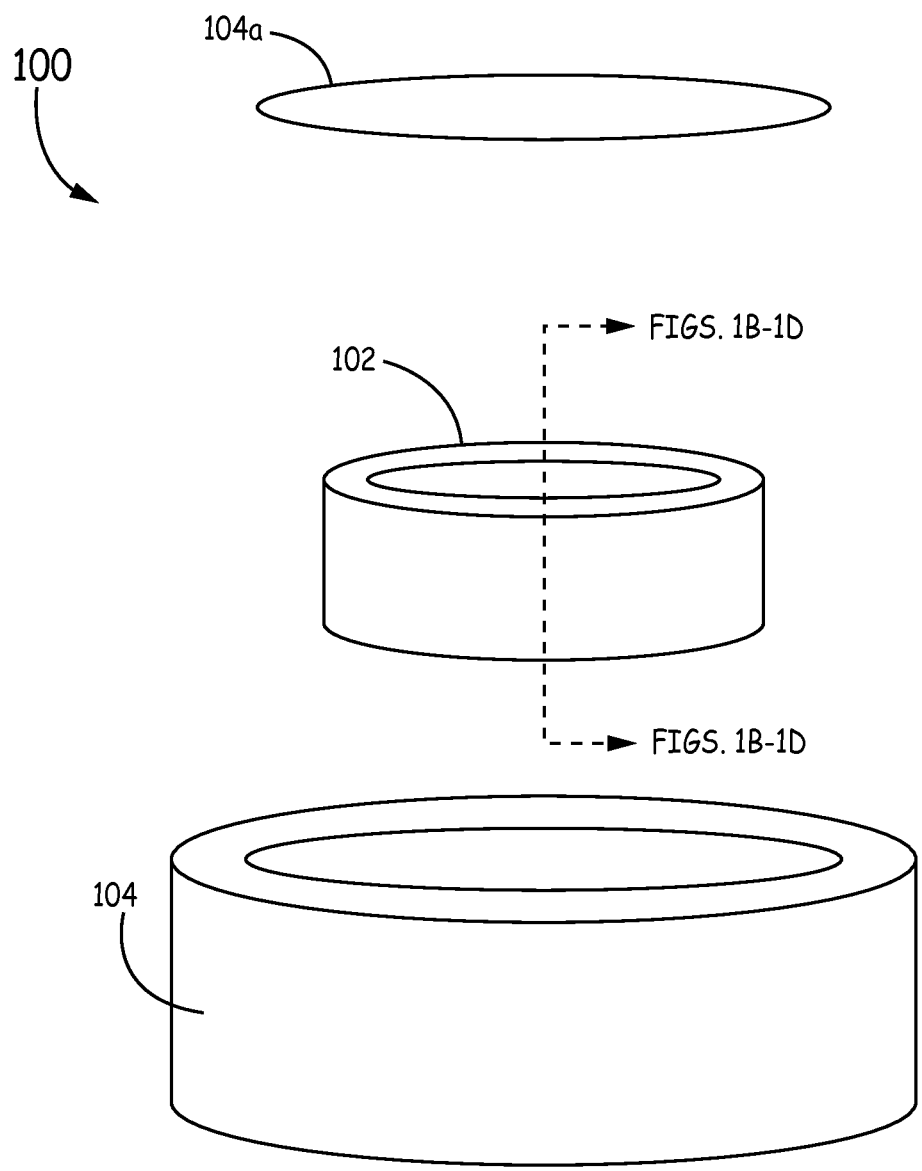
FIG. 1A is an exploded view of an example of a fiber optic sensing coil apparatus for a FOG.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

As discussed above, component deterioration in a FOG can result in a FOG becoming less accurate. In one example, component deterioration in a FOG can be due to the conversion of Oxygen gas inside a FOG's housing because FOGs have some internal components that are sensitive to Oxygen. If Oxygen levels inside the FOG's housing decrease over time, a component that is sensitive to Oxygen can perform differently and may eventually stop working One substance that may decrease the Oxygen levels in the FOG's housing are resins that hold in place the optical fiber sensing coil of the FOG. These resins consume Oxygen over time. Therefore, any components that are sensitive to Oxygen will degrade in time due to these resins consuming Oxygen.

Over time the resin used to hold the fiber optic coil in place within a sensing coil can convert Oxygen in gas surrounding the coil to Carbon Dioxide gas. This has the effect of lowering the Oxygen concentration in the FOG coil's housing, which contains the sensing coil. The subject matter described herein addresses this problem by providing a method and apparatus for introducing a layer of oxygen blocking material disposed on the outer surface of the optical fiber coil. The layer of oxygen blocking material inhibits Oxygen gas in the gyro's housing from coming into contact with the resin, and therefore, reduces or eliminates the conversion of Oxygen gas to Carbon Dioxide gas in the FOG coil's housing. This in turn keeps the FOG's components that are sensitive to Oxygen depletion in a stable condition and prolongs the performance of the FOG. The materials applied to the sensing coil to block or reduce the amount of Oxygen from contacting the resin can be polymers, liquids, inorganic materials, or metals that have been selected to have low oxygen transmission rates (OTR), as discussed in detail below.

FIG. 1A is an example of a fiber optic sensing coil apparatus 100 for a FOG. The sensing coil apparatus 100 includes a housing 104 that provides a hermetically sealed chamber and a sensing coil 102 disposed within the hermetically sealed chamber. The housing 104 is a physical structure that surrounds the sensing coil 102 and provides a hermetically sealed chamber in which the sensing coil 102 is disposed. That is, the sensing coil 102 can be disposed inside the housing 104, which can then have a cover 104a that hermetically seals the sensing coil 102 inside the housing 104. The housing 104 can be provided to insulate the sensing coil 102 and other components from the external environment and to provide an easily mountable structure for the FOG. The housing 104 can be composed of any suitable material including, but not limited to, a metal such as aluminum or steel. Although the housing 104 is shown in FIG. 1A as having a generally cylindrical geometry any suitable geometry can be used.

Figure 1B:
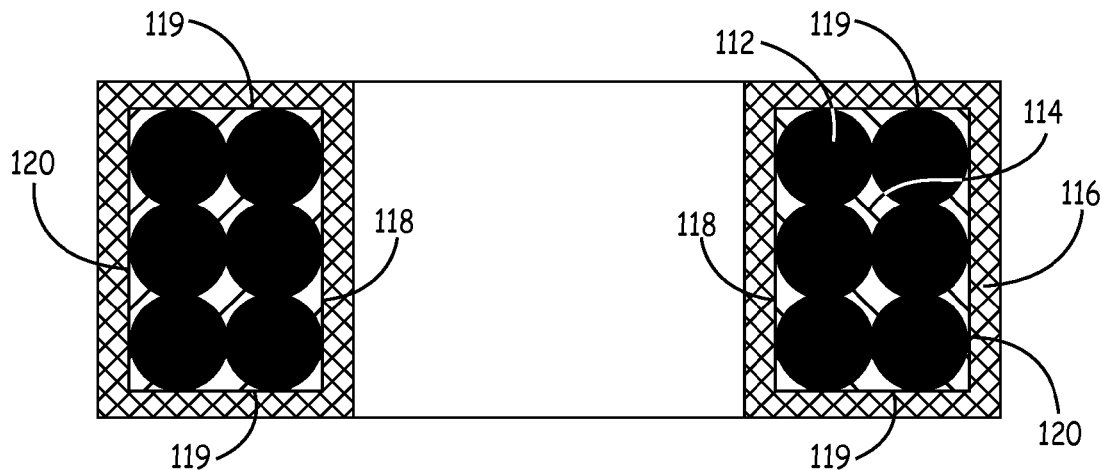
FIG. 1B-1D are cross-section examples of a sensing coil for the FOG of FIG. 1A, wherein the sensing coil includes a layer of oxygen blocking material thereon.
Figure 1C:
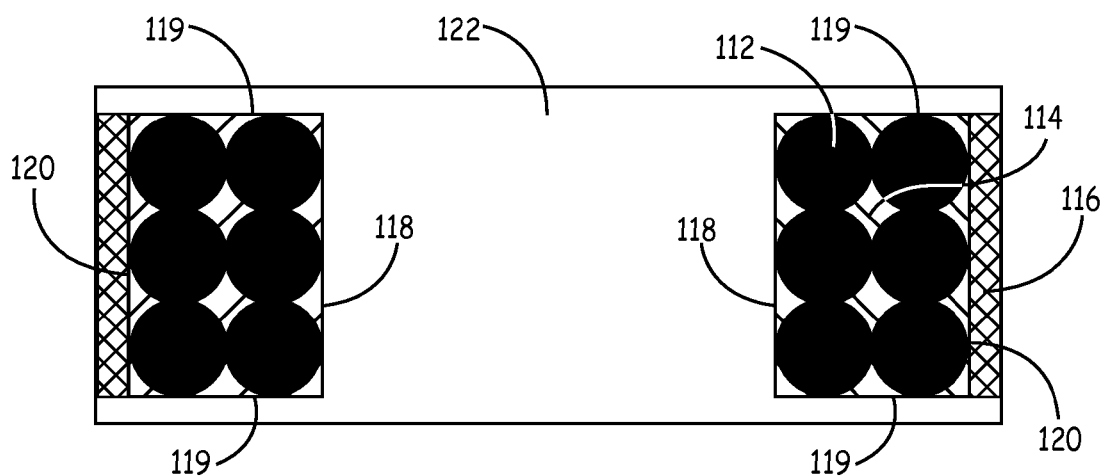
Figure 1D:
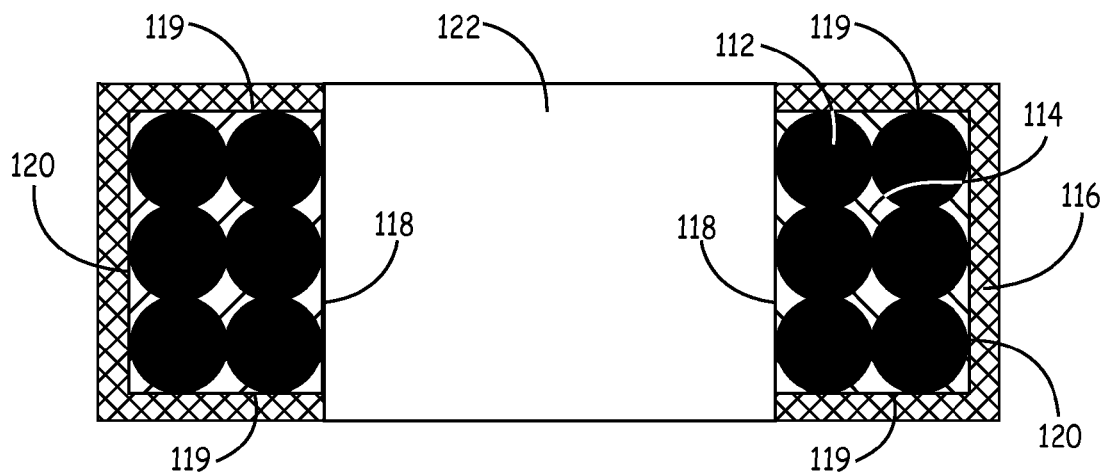

FIG. 1B is a cross-sectional view of an example sensing coil 102. The sensing coil 102 is composed of an optical fiber 112 that is disposed in a coil. In the example, shown in FIG. 1A, the coil 102 of optical fiber 112 has an annular geometry as shown by the sensing coil 102 of FIG. 1A. This annular geometry has an externally facing surface 120 and an internally facing surface 118. In some embodiments, the internally facing surface 118 defines an aperture through the coil 102. The coil 102 is formed of a plurality of loops of the optical fiber 112. In the example shown in FIG. 1A, the loops are generally aligned with one another along the axial direction, thereby forming the annular geometry of the coil 102. As shown in FIG. 1B, in addition to being disposed adjacently along the axial direction, two or more loops of the optical fiber 112 can also be disposed adjacently in a direction perpendicular to the axial direction, such that multiple loops form each "layer" of the coil 102. In other examples, as shown in FIGS. 1C-1D, the optical fiber 112 can be coiled around a rigid form 122, so that the optical fiber takes the geometry of the rigid form 122. The rigid form 122 can serve as a platform for wrapping the optical fiber 112 into a coil. The rigid form 122 can be of any shape that will maintain the functionality of the FOG and fit into the FOG's housing. In some embodiments, this entails the rigid form 122 being in a cylindrical shape. Moreover, the optical fiber 112 can be coiled on the rigid form 122 in any way that will maintain the FOG's functionality. Other geometries can also be used besides a cylinder. The rigid form 122 can be composed of any suitable material including, but not limited to, a metal such as aluminum or steel.

The optical fiber 112 serves the purpose of providing a path for the counter propagating light waves in the FOG to traverse. Any suitable optical fiber 112 can be used. In an example, the optical fiber 112 can have a high refractive index so that any light being transmitted through the optical fiber will follow an axial path in the optical fiber 112. In some embodiments, this is accomplished by having a core surrounded by a cladding material that has a lower index of refraction than the core. Light is then kept in the core by total internal refraction. In some embodiments, the optical fiber 112 can be approximately 25-200 microns in diameter and can be several kilometers in length. In some embodiments the optical fiber 112 can support multi-modes, and in other embodiments the optical fiber 112 can only support a single mode. Moreover, in some embodiments, the optical fiber 112 can be a polarizing maintaining fiber. In other embodiments, the optical fiber 112 can be a fiber that does not maintain the polarization of the propagating light waves.

An adhesive 114 is disposed amongst the optical fiber 112 in the coil 102 to hold the optical fiber 112 together in its coiled form. That is, the adhesive 114 is disposed between and around adjacent loops of optical fiber 112 in the sensing coil 112 to hold the adjacent loops in place. In some embodiments, the adhesive 114 can be applied and cured after each layer or loop of optical fiber 112 is wound. In other embodiments, the adhesive can be cured after the optical fiber 112 is completely coiled.

The adhesive 114 amongst the optical fiber 112 that holds the optical fiber together in the coil also serves the purpose of filling in the gaps between the coils of the optical fiber 112 and provides a more even surface for which subsequent layers of the optical fiber 112 can be wound onto. The adhesive 114 can be applied using various methods. One embodiment includes using an injector-type dispenser that dispenses the adhesive 114 onto the optical fiber 112. In another embodiment, the adhesive 114 can be brushed on the optical fiber 112. In another embodiment, the adhesive 114 can be sprayed on to the optical fiber 112. In even another embodiment, the adhesive 114 can be applied by dip coating the optical fiber 112 in the adhesive 114. In some embodiments, the adhesive 114 is allowed to cure after each layer of optical fiber 112 is coiled. In other embodiments, the adhesive 114 is cured after the entire optical fiber 112 has been coiled into its form. In some of these embodiments, the adhesive 114 can be a UV-cured adhesive to ensure quick curing. In other embodiments the adhesive 114 can be a thermally curable adhesive. An example of such an embodiment is the two-part epoxy Masterbond EP29LPSP.

Once the optical fiber 112 is coiled, then a layer of oxygen blocking material 116 with an OTR less than 15 cc/m$^2$/day is disposed on the outer surface of the coil of optical fiber 112, as shown in FIGS. 1B-1D. The "outer surface" of the coil 102 is defined herein as any surface that is exposed to the environment external to the coil 102. In the example shown in FIG. 1B, the outer surface includes the externally facing surface 120, the internally facing surface 118, and any exposed top and bottom surfaces 119. In the example in FIG. 1C, the outer surface only includes the externally facing surface 120, since the rigid form 122 blocks Oxygen from coming into contact with internally facing surface 118 and the top and bottom surfaces 119. In FIG. 1D, the outer surface includes the externally facing surface 120 and the top and bottom surfaces 119, since the rigid form 122 blocks Oxygen from coming into contact with the internally facing surface 118. In some embodiments, the layer of oxygen blocking material 116 is disposed on the entire outer surface of the coil of optical fiber 112. In other embodiments, the layer of oxygen blocking material 116 is disposed on only a portion of the outer surface of the coil of optical fiber 112. In an example, the layer of oxygen blocking material 116 is formed on the outer surface of the coil 102 of optical fiber 112 after the optical fiber 112 is wound into a coil.

To provide sufficient oxygen blocking, the oxygen blocking material 116 has an OTR less than 15 cc/m$^2$/day. There are various substances that can be used for the layer of oxygen blocking material 116 and there are various methods to apply these substances, as discussed in more detail below. Once the layer of oxygen blocking material 116 is disposed on the outer surface of the coil of optical fiber 112, the optical fiber 112 is disposed within the hermetically sealed chamber of the housing 104. A gas including Oxygen is disposed in the hermetically sealed chamber between the coil of the optical fiber 112 and the housing 104. The sensing coil apparatus 100 can be coupled to other components of the FOG.

Several substances of various composition and thickness that have an OTR less than 15 cc/m$^2$/day are available to use as the layer of oxygen blocking material 116 disposed on the outer surface of the coil of optical fiber 112. In some embodiments, a polymer is used; in other embodiments, a metal can be used; in other embodiments, an inorganic compound is used; in even other embodiments, a liquid that is allowed to harden can be used. In addition to the layer of oxygen blocking material's 116 OTR, one might want to consider how the layer of oxygen blocking material 116 will expand and contract over the FOG's operating temperature range, which, in some examples, is approximately −55° to +95° C. In some embodiments, to alleviate mechanical stresses to the optical fiber 112 due to the layer of oxygen blocking material's 116 expansion and contraction, the thickness of the polymer, inorganic material, metal or liquid can be thin, so that any mechanical stresses are minimized. Some example thicknesses are discussed below.

As mentioned above, one type of substance that can be used as the layer of oxygen blocking material 116 is a polymer that has an OTR less than 15 cc/m$^2$/day. Using some types of polymers has the advantage of reducing the thermal expansion and contraction issue discussed above. That is, as the temperature fluctuates between the FOG's operating temperature, some polymers are less likely to put mechanical stresses on the coiled optical fiber 112 than other substances that have the requisite OTR. In applying the layer of oxygen blocking polymer 116, the polymer 116 can be bonded to the surface of the coiled optical fiber 112 using an adhesive. In some embodiments, the adhesives 114 discussed above can be used for this purpose. As an example, the adhesive Masterbond EP29LPSP can be used to hold the polymer 116 in place. In some of these embodiments, the polymer 116 can be applied before the adhesive 114 that holds the coiled optical fiber 112 in place is allowed to cure. Then, after the polymer 116 is applied, the sensing coil 102 can be cured. In other embodiments, if the adhesive 114 holding the optical fiber 112 in place is already cured, more adhesive 114 can be applied on the outer surface of the coiled optical fiber 112 before the polymer 116 is applied. If the adhesive 114 does not adhere well to the polymer 116, in some embodiments, a primer or plasma etching or both can be used to increase adhesion. After the polymer 116 is applied, then the adhesive can be cured. One example of a polymer that can be used is OXYSHIELD 2545, which is a biaxally oriented nylon 6 film coated on one side with PVdC. OXYSHIELD 2545 has a OTR of 14.0 cc/m$^2$/day. Moreover, the thickness of the OXYSHIELD 2545 is on the order of 25 microns thick or less; however, as mentioned above, the thickness of polymer can be more or less, depending on the polymer used and whether the polymer will exert mechanical stresses on the coiled optical fiber 112 within the FOG's operating temperature range. Similar to other polymers, OXYSHIELD 2545 can be bonded to the surface of the coil using an adhesive, such as Masterbond EP29LPSP.

Another substance that can be used as the layer of oxygen blocking material 116 is a metal that has an OTR less than 15 cc/m$^2$/day. In an embodiment, the metal 116 can be applied to the coiled optical fiber 112 using chemical vapor deposition or physical vapor deposition. Moreover, in some embodiments, the thickness of the metal 116, after it is applied, can have a thickness of approximately 25 microns or less. An example metal 116 that can be used is gold. As stated above, the gold can be applied using physical vapor deposition and has a thickness less than 25 microns after it is applied.

Another substance that can be used as the layer of oxygen blocking material 116 is an inorganic material that has an OTR less than 15 cc/m$^2$/day. In an embodiment, the inorganic material can be applied to the coiled optical fiber 112 using chemical vapor deposition or physical vapor deposition. Moreover, in some embodiments, the thickness of the inorganic material 116, after it is applied, can have a thickness of approximately 25 microns or less. An example inorganic material that can be used is Tetraethyl Orthosilicate applied using Plasma Enhanced Chemical Vapor Deposition and has a thickness less than 25 microns after it is applied.

Another substance that can be used as the layer of oxygen blocking material 116 is a liquid that is allowed to harden on the outer surface of the coil, which has an OTR less than 15 cc/m$^2$/day. In some embodiments, the liquid 116 can be brushed or sprayed on the coiled optical fiber 112. In some other embodiments, the liquid 116 can be dip coated onto the surface of the coiled optical fiber 112. After the liquid 116 is applied to the coiled optical fiber 112, the liquid 116 can then be allowed to harden before incorporating the sensing coil apparatus 100 into a FOG. An example of a liquid 116 that has the requisite OTR is a polyvinyl alcohol solution, Selvol 325. In some embodiments, the resin, Selvol 325, can be dissolved at 18% solids into a solution to create the polyvinyl alcohol solution. As mentioned throughout this disclosure, this is only an example and not meant to be limiting. After the Selvol 325 is allowed to harden, in some embodiments, the thickness of the Selvol 325 is approximately 75 microns thick or less.

Moreover, in some embodiments, a tracer substance can be added to the liquid 116, so that the liquid 116 can be inspected for complete coverage of the outer surface of the coil. However, if a tracer substance is added to the liquid 116, the combination of the tracer substance and the liquid 116 still must have an OTR less than 15 cc/m$^2$/day. Further, in some embodiments, if the liquid 116 is susceptible to fungus growth, which is not acceptable for some FOG applications, a biocide can be added to the liquid 116. For example, the fungicide Kathon LX, at less than 50 parts per million, can be used. Again, if a biocide is added to the liquid, the combination of the biocide and the liquid 116 still must have an OTR less than 15 cc/m$^2$/day.

In some embodiments, a combination of the above example materials can be used as the layer of oxygen blocking material 116. For example, a liquid and a polymer can be used in combination to yield an OTR of less than 15 cc/m$^2$/day. Once the layer of oxygen blocking material 116 having an OTR less than 15 cc/m$^2$/day is in place, the surface of the coiled optical fiber 112 is exposed to less or no Oxygen gas that is in the hermetically sealed chamber; and therefore, the original concentration of Oxygen within the gas within the housing is preserved.

Figure 2:
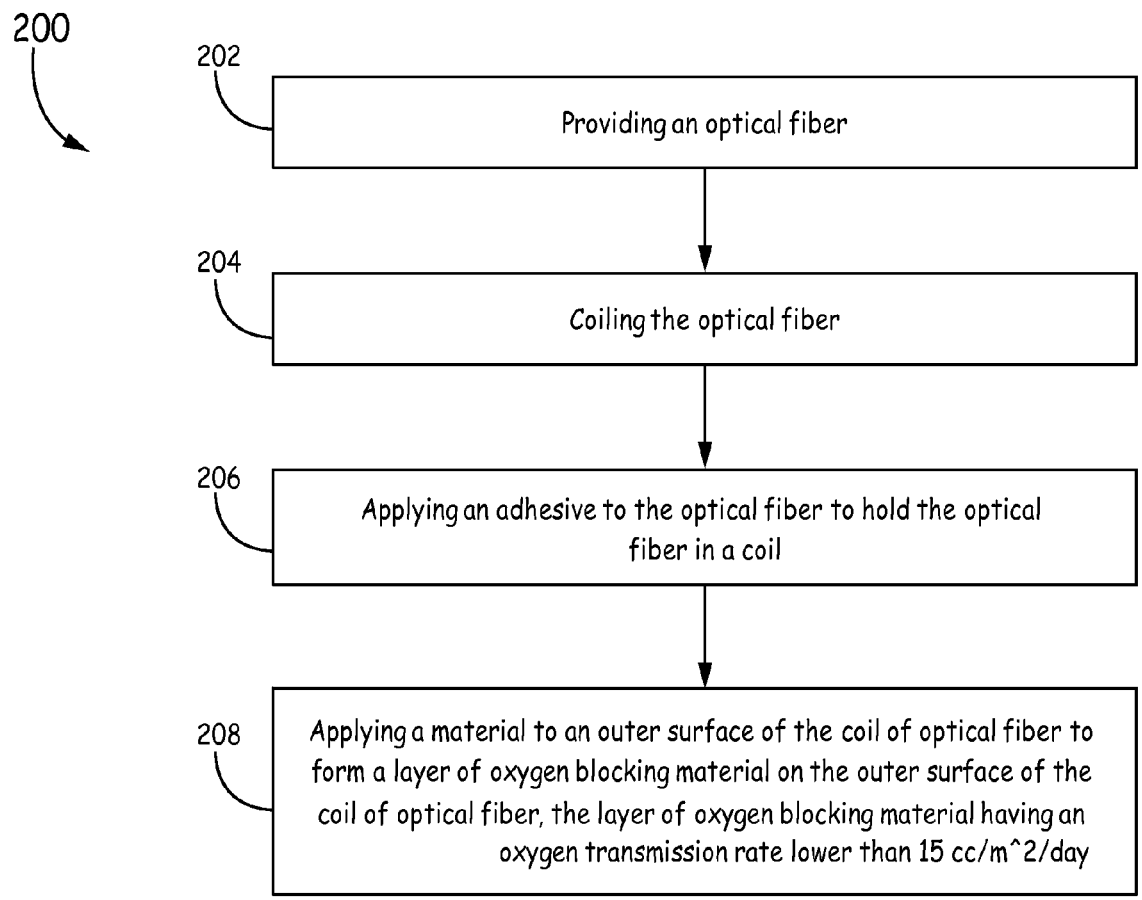
FIG. 2 is a flow diagram of an example of a method for applying a material to a sensing coil in order to form a layer having a low oxygen transmission rate (OTR) on the sensing coil as shown in FIG. 1B.

FIG. 2 is a flow diagram of an example of a method 200 to reduce gas conversion in a fiber-optic gyroscope. More specifically, the method 200 can be used to reduce the conversion of Oxygen gas into Carbon Dioxide gas inside a FOG's sensing coil's housing.

The method 200 includes providing an optical fiber (block 202), coiling the optical fiber (block 204), applying an adhesive to the optical fiber to hold the optical fiber in a coil (block 206), and applying a material to an outer surface of the coil of optical fiber to form a layer of oxygen blocking material on the outer surface of the coil of optical fiber, the layer of oxygen blocking material having an oxygen transmission rate lower than 15 cc/m$^2$/day (block 208).

In some embodiments, the optical fiber in block 202 can have any of the characteristics of the optical fiber 112 discussed above in FIG. 1. In addition, in block 204, the optical fiber can be coiled in any manner so long as the FOG's functionality is maintained. Examples are given in the discussion of FIG. 1 above. The adhesive in block 206, in some embodiments, can have any of the characteristics of the adhesive 114 discussed above in FIG. 1. Finally, in some embodiments, the material in block 208 that is applied to the outer surface of the coil of optical fiber to form a layer of oxygen blocking material on the outer surface of the coil of optical fiber, wherein the layer of oxygen blocking material has an OTR lower than 15 cc/m$^2$/day, can be any of the materials 116 discussed in FIG. 1 above or a combination thereof, and have any of those materials' 116 properties.

For example, the material in block 208 can be a polymer, such as a polymer described in FIG. 1 above. Moreover, the polymer can be bonded to the outer surface of the coil of optical fiber using an adhesive, such as an adhesive described in FIG. 1 above. In another example, the material in block 208 can be a metal, such as a metal described in FIG. 1 above. The metal can be deposited on the outer surface of the coil of optical fiber using chemical vapor deposition or physical vapor deposition to form a layer of metal as the layer of oxygen blocking material. In an embodiment, the layer of metal can be deposited so that the layer of metal is less than 25 microns thick. In another embodiment, the material in block 208 can be an inorganic material, such as an inorganic material described in FIG. 1 above. The inorganic material can be deposited on the outer surface of the coil of optical fiber using chemical vapor deposition or physical vapor deposition to form a layer of inorganic material as the layer of oxygen blocking material. In an embodiment, the layer of inorganic material can be deposited so that the layer of inorganic material is less than 25 microns thick. In an embodiment, the inorganic material can be Tetraethyl Orthosilicate and be applied using Plasma Enhanced Chemical Vapor Deposition. In another example, the material in block 208 can be a liquid, such as a liquid described in FIG. 1 above. The liquid can be applied using one or more of the following techniques: brushing the liquid on the outer surface of the coil of optical fiber, spraying the liquid on the outer surface of the coil of optical fiber, or dipping the coil of optical fiber in the liquid. After which, the liquid is allowed to harden. In some embodiments, after the liquid is allowed to harden, the layer of oxygen blocking material can be less than 75 microns thick.

EXAMPLE EMBODIMENTS

Example 1 includes a fiber optic sensing coil apparatus for a fiber optic gyroscope comprising: a housing providing a hermetically sealed chamber; an optical fiber disposed within the hermetically sealed chamber of the housing, the optical fiber disposed in a coil, wherein a gas including oxygen is disposed in the hermetically sealed chamber between the coil of the optical fiber and the housing; an adhesive amongst the optical fiber, the adhesive holding the optical fiber together in the coil; and a layer of oxygen blocking material disposed on an outer surface of the coil of optical fiber, wherein the oxygen blocking material has an oxygen transmission rate less than 15 cc/m$^2$/day.

Example 2 includes the sensing coil apparatus of Example 1, wherein the layer of oxygen blocking material is composed of a polymer.

Example 3 includes the sensing coil apparatus of Example 2, wherein the layer of oxygen blocking material is less than 75 microns thick.

Example 4 includes the sensing coil apparatus of any of Examples 1-3, wherein the layer of oxygen blocking material is composed of a meta.

Example 5 includes the sensing coil apparatus of Example 4, wherein the metal is gold.

Example 6 includes the sensing coil apparatus of any of Examples 4-5, wherein the layer of oxygen blocking material is less than 25 microns thick.

Example 7 includes the sensing coil apparatus of any of Examples 1-6, wherein the layer of oxygen blocking material is composed of a liquid that is allowed to harden.

Example 8 includes the sensing coil apparatus of Example 7, wherein the layer of oxygen blocking material is less than 75 microns thick.

Example 9 includes the sensing coil apparatus of any of Examples 1-8, wherein the layer of oxygen blocking material is composed of an inorganic material.

Example 10 includes the sensing coil apparatus of Example 9, wherein the inorganic material is Tetraethyl Orthosilicate.

Example 11 includes the sensing coil apparatus of any of Examples 9-10, wherein the layer of oxygen blocking material is less than 25 microns thick.

Example 12 includes the sensing coil apparatus of any of Examples 1-11, wherein the layer of oxygen blocking material is disposed on the entire outer surface of the coil of optical fiber.

Example 13 includes a method to reduce gas conversion in a fiber-optic gyroscope, the method comprising: providing an optical fiber; coiling the optical fiber; applying an adhesive to the optical fiber to hold the optical fiber in a coil; applying a material to an outer surface of the coil of optical fiber to form a layer of oxygen blocking material on the outer surface of the coil of optical fiber, the layer of oxygen blocking material having an oxygen transmission rate lower than 15 cc/m$^2$/day.

Example 14 includes the method of Example 13, wherein the material is a layer of polymer, wherein applying the material includes bonding the layer of polymer to the outer surface of the coil of optical fiber using an adhesive.

Example 15 includes the method of any of Examples 13-14, wherein the material is a metal, wherein applying the material includes depositing the metal on the outer surface of the coil of optical fiber using chemical vapor deposition to form a layer of metal as the layer of oxygen blocking material.

Example 16 includes the method of any of Examples 13-15, wherein the material is an inorganic coating, wherein applying the material includes depositing the inorganic coating on the outer surface of the coil of optical fiber using chemical vapor deposition.

Example 17 includes the method of any of Examples 13-16, wherein the material is a liquid, wherein applying the material includes one or more of the following techniques: brushing the liquid on the outer surface of the coil of optical fiber, spraying the liquid on the outer surface of the coil of optical fiber, or dipping the coil of optical fiber in the liquid.

Example 18 includes a fiber optic sensing coil comprising: an optical fiber coiled around a rigid form; an adhesive amongst the optical fiber, the adhesive holding the optical fiber together in its coiled form; a layer of oxygen blocking material disposed on an outer surface of the coil of optical fiber, wherein the oxygen blocking material has an oxygen transmission rate less than 15 cc/m$^2$/day; wherein the layer of oxygen blocking material disposed on the outer surface of the coil of optical fiber is a polyvinyl alcohol solution that is allowed to harden; and wherein the polyvinyl alcohol solution is disposed on the outer surface of the coil of optical fiber by dip coating the coil of optical fiber in the polyvinyl alcohol solution.

Example 19 includes the fiber optic sensing coil of Example 18, wherein the polyvinyl alcohol solution is less than 75 microns thick after it is allowed to harden.

Example 20 includes the fiber optic sensing coil of any of Examples 18-19, further comprising a housing that provides a hermetically sealed chamber, which the fiber optic sensing coil is disposed within.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A fiber optic sensing coil apparatus for a fiber optic gyroscope comprising:
 a housing providing a hermetically sealed chamber;
 an optical fiber disposed within the hermetically sealed chamber of the housing, the optical fiber disposed in a coil, wherein a gas including oxygen is disposed in the hermetically sealed chamber between the coil of the optical fiber and the housing;
 an adhesive amongst the optical fiber, the adhesive holding the optical fiber together in the coil; and
 a layer of oxygen blocking material disposed on an outer surface of the coil of optical fiber, wherein the oxygen blocking material has an oxygen transmission rate less than 15 cc/m$^2$/day.

2. The sensing coil apparatus of claim 1, wherein the layer of oxygen blocking material is composed of a polymer.

3. The sensing coil apparatus of claim 2, wherein the layer of oxygen blocking material is less than 75 microns thick.

4. The sensing coil apparatus of claim 1, wherein the layer of oxygen blocking material is composed of a metal.

5. The sensing coil apparatus of claim 4, wherein the metal is gold.

6. The sensing coil apparatus of claim 4, wherein the layer of oxygen blocking material is less than 25 microns thick.

7. The sensing coil apparatus of claim 1, wherein the layer of oxygen blocking material is composed of a liquid that is allowed to harden.

8. The sensing coil apparatus of claim 7, wherein the layer of oxygen blocking material is less than 75 microns thick.

9. The sensing coil apparatus of claim 1, wherein the layer of oxygen blocking material is composed of an inorganic material.

10. The sensing coil apparatus of claim 9, wherein the inorganic material is Tetraethyl Orthosilicate.

11. The sensing coil apparatus of claim 9, wherein the layer of oxygen blocking material is less than 25 microns thick.

12. The sensing coil apparatus of claim 1, wherein the layer of oxygen blocking material is disposed on the entire outer surface of the coil of optical fiber.

13. A method to reduce gas conversion in a fiber-optic gyroscope, the method comprising:
providing an optical fiber;
coiling the optical fiber;
applying an adhesive to the optical fiber to hold the optical fiber in a coil;
applying a material to an outer surface of the coil of optical fiber to form a layer of oxygen blocking material on the outer surface of the coil of optical fiber, the layer of oxygen blocking material having an oxygen transmission rate lower than 15 $cc/m^2/day$.

14. The method of claim 13, wherein the material is a layer of polymer, wherein applying the material includes bonding the layer of polymer to the outer surface of the coil of optical fiber using an adhesive.

15. The method of claim 13, wherein the material is a metal, wherein applying the material includes depositing the metal on the outer surface of the coil of optical fiber using chemical vapor deposition to form a layer of metal as the layer of oxygen blocking material.

16. The method of claim 13, wherein the material is an inorganic coating, wherein applying the material includes depositing the inorganic coating on the outer surface of the coil of optical fiber using chemical vapor deposition.

17. The method of claim 13, wherein the material is a liquid, wherein applying the material includes one or more of the following techniques: brushing the liquid on the outer surface of the coil of optical fiber, spraying the liquid on the outer surface of the coil of optical fiber, or dipping the coil of optical fiber in the liquid.

18. A fiber optic sensing coil comprising:
an optical fiber coiled around a rigid form;
an adhesive amongst the optical fiber, the adhesive holding the optical fiber together in its coiled form;
a layer of oxygen blocking material disposed on an outer surface of the coil of optical fiber, wherein the oxygen blocking material has an oxygen transmission rate less than 15 $cc/m^2/day$;
wherein the layer of oxygen blocking material disposed on the outer surface of the coil of optical fiber is a polyvinyl alcohol solution that is allowed to harden; and
wherein the polyvinyl alcohol solution is disposed on the outer surface of the coil of optical fiber by dip coating the coil of optical fiber in the polyvinyl alcohol solution.

19. The fiber optic sensing coil of claim 18, wherein the polyvinyl alcohol solution is less than 75 microns thick after it is allowed to harden.

20. The fiber optic sensing coil of claim 18, further comprising a housing that provides a hermetically sealed chamber, which the fiber optic sensing coil is disposed within.

* * * * *